Jan. 30, 1962 C. W. HEDSTROM 3,019,028
CONVERTIBLE BABY VEHICLES
Filed Aug. 19, 1958 3 Sheets-Sheet 1

Inventor:
Carl W. Hedstrom
by John H. McKenna
Attorney

Jan. 30, 1962 C. W. HEDSTROM 3,019,028
CONVERTIBLE BABY VEHICLES
Filed Aug. 19, 1958 3 Sheets-Sheet 3
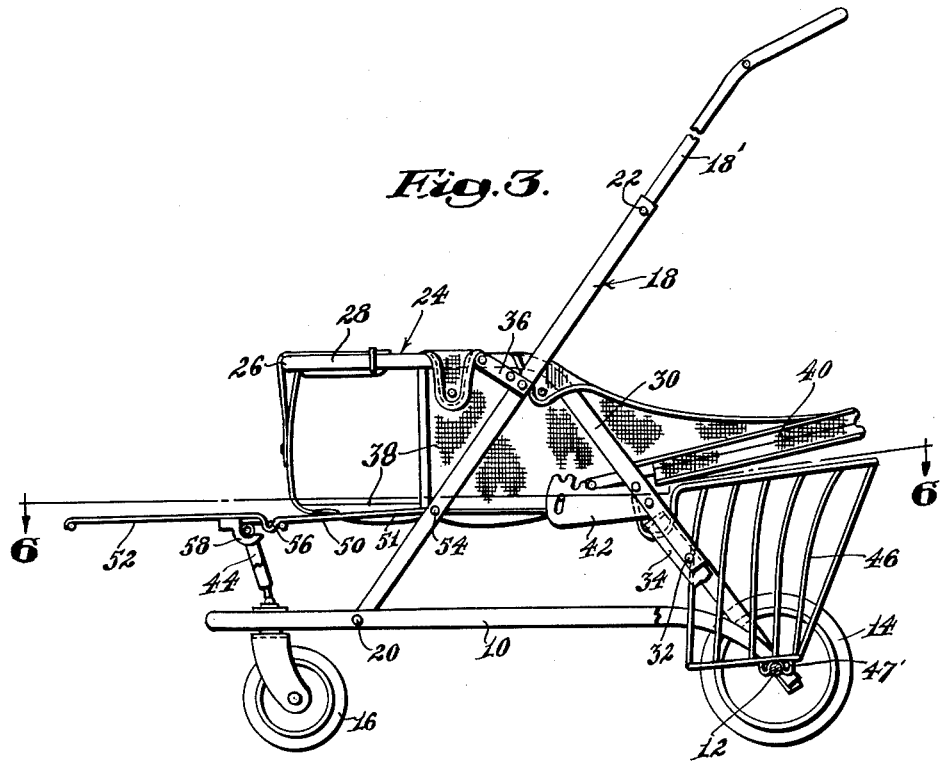
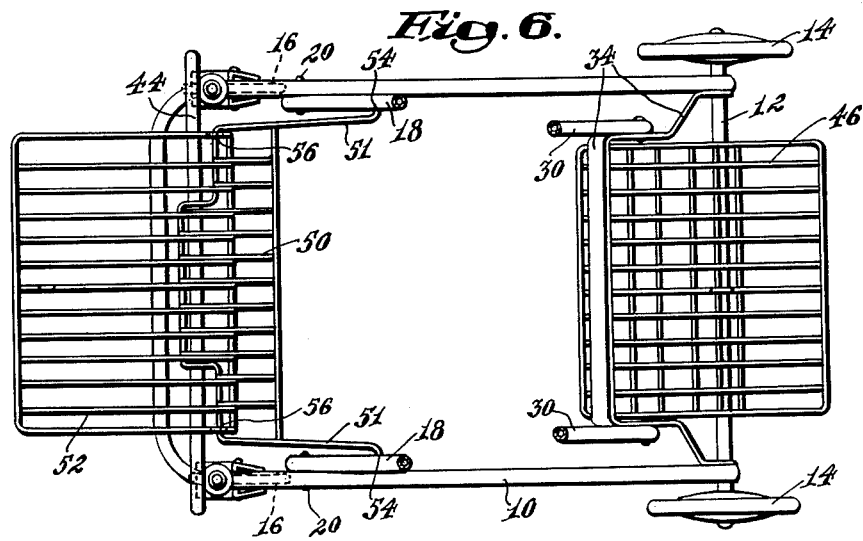
Inventor:
Carl W. Hedstrom
by John H. McKenna
Attorney

United States Patent Office 3,019,028
Patented Jan. 30, 1962

3,019,028
CONVERTIBLE BABY VEHICLES
Carl W. Hedstrom, Gardner, Mass., assignor to Hedstrom Union Company, Fitchburg, Mass., a corporation of Massachusetts
Filed Aug. 19, 1958, Ser. No. 755,963
8 Claims. (Cl. 280—36)

This invention relates to improvements in convertible baby vehicles of the stroller variety. More particularly, the invention provides an improved baby vehicle which may serve the purposes of a conventional stroller and which is readily convertible for serving as a baby-walker. A foot rest is adjustable between two feet-supporting positions, and is quickly shiftable to an out-of-the-way position when the vehicle is to be used as a baby-walker.

It is among the objects of the invention to provide a convertible baby vehicle wherein a foot rest is pivotally supported on the base frame of the vehicle and is adjustable to any of three positions, an upper substantially horizontal position, a lower position wherein it is suitably clamped to the base frame for serving as a sturdy foot rest, and a third out-of-the-way position wherein it is under the seat and supported on the rear axle.

Another object of the invention is to provide a pivotally mounted foot rest for baby vehicles which may be maintained in an upper, substantially horizontal position by a pivoted "bumper" member which can be raised from its conventional bumper position to a foot rest supporting position, preferably when the vehicle back rest is lowered to support a reclining child, and which may be secured in a lower second position suitable for supporting a baby's feet when the vehicle back-rest is in its upright position, and in a third out-of-the-way position wherein the foot rest is swung back under the vehicle seat to rest on the rear axle whereby a forward region is cleared for the feet of a baby to contact the floor and propel the vehicle as a baby walker.

A further object of the invention is to provide a foot rest for use with a baby vehicle, the said foot rest having two wire members in hinged relationship, of which one is pivotally supported on the vehicle base frame, and the other is pivotally supported on said one member and is swingable in conjunction with swinging of said one member from a lower foot-rest position, in which the two members are approximately in right-angular relation to each other, to an upper position wherein it is essentially in the same plane as said one member and an extension of it, the two said wire members being also swingable rearwardly into supported engagement with the rear axle of the vehicle thereby to provide forward clear space in which the legs of a baby may engage the floor in use of the vehicle as a baby-walker.

Yet another object of the invention is to provide a pivotally supported foot rest for a collapsible baby vehicle of the stroller variety, the said foot rest being movable between any of three positions and being readily foldable.

It is, moreover, my purpose and object generally to improve the structure and utility of foot rests for baby vehicles, and especially foot rests which may be adjusted to any of three positions, including an out-of-the-way position which conditions the vehicle for serving as a baby-walker.

In the accompanying drawings:

FIG. 3 is a side elevation of the vehicle of FIGS. 1 and 2 with the foot rest in its elevated horizontal position for supporting the legs of a reclining baby;

FIG. 4 is a top plan view in cross-section approximately on line 4—4 of FIG. 1;

FIG. 6 is a top plan view in cross-section approximately on line 6—6 of FIG. 3.

Figure 1:
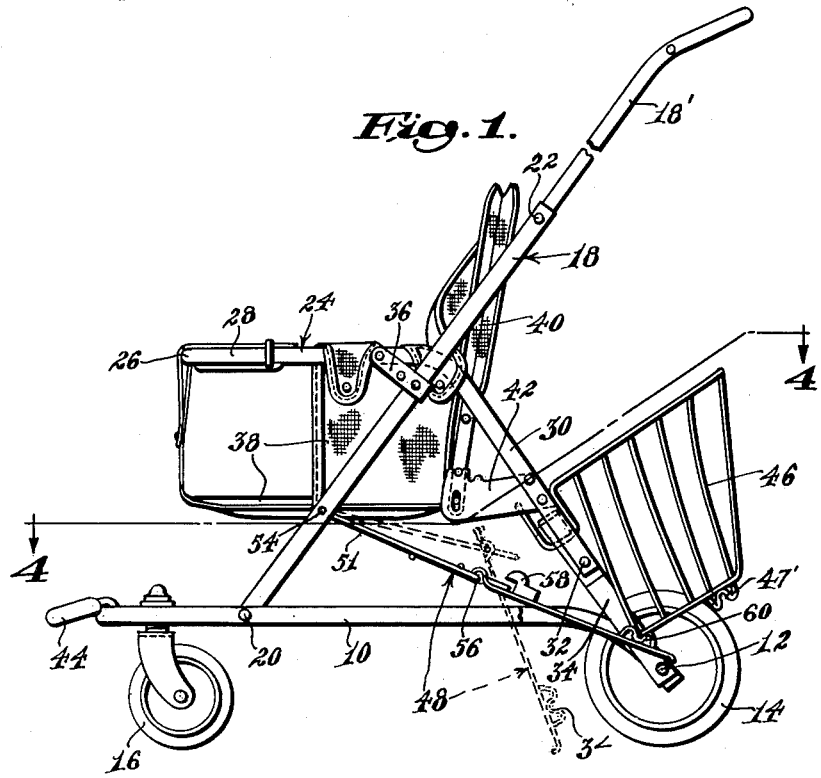
FIG. 1 is a side elevation of a baby vehicle in condition for serving as a baby-walker, a rear part of the base frame being broken away, and the foot rest being in its out-of-the-way position.

Referring to the drawings, the illustrated vehicle has a generally U-shaped tubular base frame member 10 whose ends support a rear axle 12 which has the rear wheels 14 thereon. Caster-type front wheels 16 are swively mounted at the forward end of member 10 adjacent to the bridge portion thereof, one wheel at each side of the member, and the four wheels support member 10 generally in a horizontal plane.

An inverted U-shaped tubular frame member 18 has each of its ends pivotally connected at 20 to a different side portion of base member 10, the upper bridging portion of member 18 constituting a conventional variety of pusher handle for the vehicle. Preferably, and as shown, the pusher handle portion of member 18, indicated at 18', has U-arms telescopically engaged in lower portions of member 18, whereby the pusher handle may be drawn out to a suitable operative length and may be thrust inward for conservation of space when the vehicle is being collapsed. Any suitable means 22 may be provided for releasably securing the pusher handle in its said drawn-out condition.

Another generally U-shaped tubular member 24 has its bridge portion 26 and substantial portions 28 of its side arms disposed in a horizontal plane, with rearward portions of the side arms bent downwardly and extending downwardly and rearwardly at 30, 30. The lower end portions of the side arms are secured at 32, 32 to a U-bracket member 34 whose lower ends are pivotally supported on the rear axle 12. The horizontal portions 28 of the side arms of U-member 24 are connected by brackets 36 to the opposite side arms of inverted U-member 18.

Figure 2:
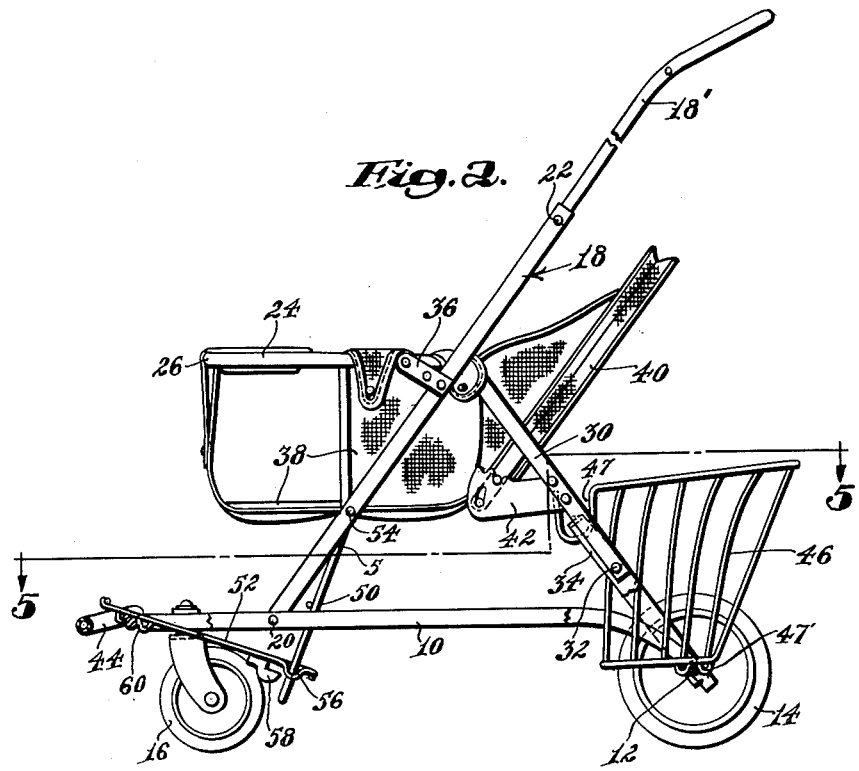
FIG. 2 is a side elevation of the vehicle of FIG. 1 in condition to serve as a stroller, the foot rest being in its lower feet-supporting position.

A suitable seat 38 is suspended on the horizontal side arm portions 28, 28 and bridging portion 26 of U-member 24, in a conventional manner, and a back rest 40 is adjustably pivoted on the side brackets 42 of side arm portions of inverted U-member 18. The back rest is adjustable between the three different operative positions in which it is shown in FIGS. 1, 2 and 3.

A conventional bumper element 44 is pivotally mounted at the forward end of base member 10 and may be swung from its normal bumper position of FIGS. 1, 2, 4 and 5 to a foot-rest supporting position as shown in FIGS. 3 and 6.

The invention is primarily concerned with a foot-rest which is adjustable between two operative foot-rest positions and a third out-of-the-way position wherein it conditions the vehicle for serving as a baby-walker.

The foot-rest, of wire or other suitable material, indicated generally at 48, comprises sections 50, 52 which coact to form an adjustable support for a baby's legs or feet. Section 50, at opposite sides thereof, has an extending element 51 pivotally connected at 54 to the adjacent arms of inverted U-member 18, whereby the foot rest section 50 is swingable about the pivots at 54.

Foot rest section 52 is pivotally connected to section 50 by a hinge means at 56 and is swingable about the hinge means 56 between a position in which it is substantially in the same plane as section 50, as in FIG. 3, and any of various positions in which section 52 may be angularly related to section 50. Each of sections 50, 52 has a stop-portion extending beyond the axis of hinge means 56, whereby the sections are mutually stopped when they come into substantial alignment in a common plane, such as when they are in their positions of FIG. 3 in which section 52 constitutes an extension of section 50. A pair of hook elements 58 on the under side of section 52 are adapted to receive the bumper element 44 therein when the bumper element is swung upwardly to its foot-rest supporting position of FIG. 3. Ordinarily, the back rest 40 will be in its lowered FIG. 3 position when the foot-rest sections are supported in a generally horizontal common plane as in FIG. 3 although, if desired, the back rest might be in either of its other two positions.

FIGS. 1 and 4 show foot-rest 48 in a position wherein it is swung back under the vehicle seat with section 52 resting on the rear axle 12 of the vehicle. The extended stop-portions of the two sections 50, 52 mutually engage each other to keep the two sections essentially in the same plane at locations where the sections are out-of-the-way of a child's legs and feet which may directly engage the floor or ground for propelling the vehicle in the manner of a baby-walker. The pusher handle if desired, may be pushed inward to reduce the amount of its upward projection during use of the vehicle as a baby-walker.

Figure 5:
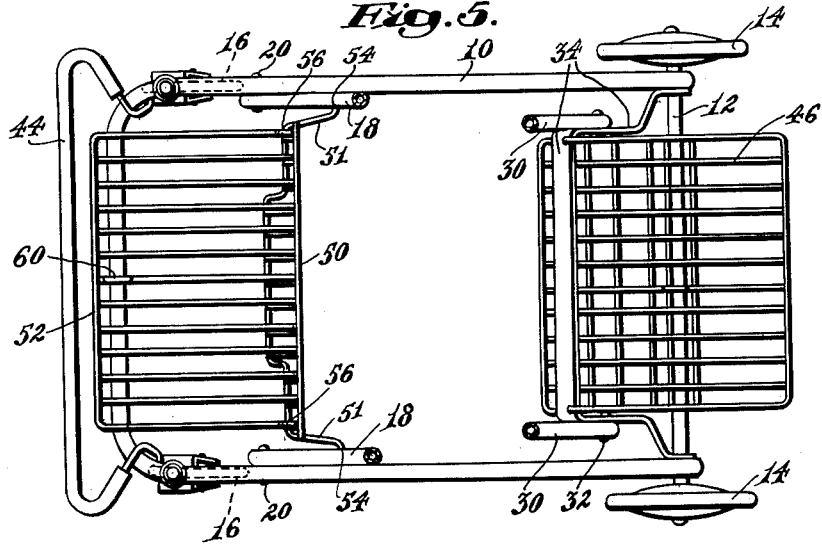
FIG. 5 is a top plan view in cross-section approximately on line 5—5 of FIG. 2.

When the vehicle is to be used as an ordinary stroller, with a baby sitting generally erect therein, the foot-rest sections may be adjusted to their positions of FIGS. 2 and 5 in which they are in generally right-angular relationship, with section 52 resting on the forward bridge portion of the base member 10, and maintained in a generally rigid condition by means of a retainer 60 having a notch formed at the under side of section 52 and engaged over the said bridge portion of base member 10.

The shopping basket 46 has a hook part at 47 for engaging the crossing portion of U-bracket 34, and the bottom of the basket has a retainer means 47' thereon for engaging around the rear axle 12 when the foot-rest 48 is in either of its forward positions. But when the foot-rest sections are in their out-of-the-way positions of FIGS. 1 and 4, the basket 46 is tilted upwardly as in FIG. 1, and a lower corner portion of the basket engages and rests in the retainer means 60 on foot-rest section 52.

It will be obvious that changes in details of construction may be made within the scope of the appended claims, and it is intended that the patent shall cover, by suitable expression in the appended claims whatever features of patentable novelty exist in the invention disclosed.

I claim as my invention:

1. In a convertible baby vehicle having a chassis including a rear axle and a seat on said chassis, the combination therewith of an articulated foot-rest pivoted on said chassis and swingable to a plurality of operative positions, one of said positions being a carriage position in which said foot-rest sections are extended horizontally in approximately the same plane, a second of said positions being a stroller position in which said adjacent foot-rest sections are right angularly related forwardly of said seat and a third of said positions being a walker position wherein said foot-rest sections are in the same general plane and are supported by said rear axle, a bumper member pivoted on said chassis and adjustable from a lower position in which it projects forwardly of said chassis to an upper position in which it supports said foot-rest in its said carriage position, and means on one of said foot-rest sections supportively engaging said chassis when said foot-rest is in its said stroller position.

2. In a baby vehicle having a chassis, a horizontal platform suitable for accommodating a baby in a sitting or reclining position supported on said chassis, a chassis portion forward of and below said platform, a chassis portion rearward of and below said platform, the combination therewith of a foot-rest, said foot-rest comprising a plurality of platform sections connected together for relative movement, means pivotally connecting said foot-rest to said chassis whereby said foot-rest is adapted for unobstructed swinging movement between a carriage position in which said sections extend forwardly and in the approximate plane of said seating platform, and a walker position in which said sections extend rearwardly of and below said seating platform out of the way of the rider's feet which may directly engage the ground, means on one and co-acting with the other of said forward chassis portion and said foot-rest for supporting the foot-rest in its said carriage position, and means on said rearward chassis portion for supporting the foot-rest in its said walker position.

3. In a convertible baby vehicle, the combination as defined in claim 2, wherein said first mentioned foot-rest supporting means comprises a bumper member pivoted on said forward chassis portion and adjustable from a lower position in which it extends forwardly of said forward chassis portion to an upper position in which it engages under said foot-rest.

4. In a convertible baby vehicle, the combination as defined in claim 2 wherein said last mentioned foot-rest supporting means comprises a rear axle of said chassis.

5. In a convertible baby vehicle, the combination as defined in claim 2 wherein said footrest comprises a plurality of hinged sections and is swingable also to a stroller position in which it extends forwardly of said seating platform and in which adjacent ones of said hinged sections are in generally right angular relationship and means at the underside of one of said hinged sections engaging said forward chassis portion to support and maintain said footrest in said stroller position.

6. In a convertible baby vehicle having a chassis and a horizontal seating platform supported on said chassis, the combination therewith of a footrest, said footrest comprising a plurality of platform sections connected together for relative movement, means pivotally connecting said footrest to said chassis whereby said footrest is adapted for unobstructed swinging movement between a plurality of operative positions, one of said positions being a carriage position in which said sections are horizontal and in the approximate plane of said seating platform, a second of said positions being a stroller position in which said footrest inclines below and forwardly of said seating platform, and a third of said positions being a walker position in which said sections extend below and rearwardly of said seating platform out of the way of the rider's feet which may directly engage the ground, and co-acting means on said chassis and said footrest for supporting said footrest in each of its operative positions.

7. In a convertible baby vehicle having a chassis including an upwardly extending frame member and a horizontal seat having leg openings therein supported on said frame member, the combination therewith of a footrest swingably supported from said chassis through pivots located on said frame member rearwardly of said leg openings and comprising a plurality of hinged sections of which adjacent sections are adapted for relative swinging from an intermediate position in which adjacent sections are generally right angularly related to an open position in which said adjacent sections are in the same general plane, co-acting means on said footrest sections for limiting the relative swinging of said sections when said sections are in said open position, means on said chassis for supporting said footrest in a carriage position aligned with and in the approximate plane of said seat and in which said adjacent sections are in the open position, and means for supporting said footrest in a stroller position below and forwardly of said seat and in which said adjacent sections are in the intermediate position.

8. In a convertible baby vehicle having a chassis and a generally horizontal seating platform with leg openings therein supported on said chassis, the combination therewith of a footrest, said footrest comprising a plurality of platform sections connected together for relative movement, means pivotally connecting one of said sections to said chassis whereby said footrest is adapted for unobstructed swinging movement between a carriage position in which said sections are forwardly and in the approximate plane of said seating platform and a walker position in which said sections extend under said seating platform out of the way of the baby's feet which may directly engage the ground, a bumper member mounted at a forward location on said chassis and swingable about its axis into an upright footrest supporting position in which it supports said footrest in said carriage position, and means on said chassis for supporting said footrest in its said walker position.

References Cited in the file of this patent

UNITED STATES PATENTS

| | | |
|---|---|---|
| 1,778,513 | Siebert | Oct. 14, 1930 |
| 2,360,483 | Felsher | Oct. 17, 1944 |
| 2,427,964 | Hansburg | Sept. 23, 1947 |
| 2,428,935 | Hansburg | Oct. 14, 1947 |
| 2,798,730 | Smith | July 9, 1957 |
| 2,798,733 | Gill | July 9, 1957 |
| 2,823,043 | Shone | Feb. 11, 1958 |